AUTOMATED PRODUCTION LINE FOR MULTIPLE-OPERATION PROCESSING OF WORK, FOR EXAMPLE, BEARING RACES ON MACHINE TOOLS
Filed April 18, 1962 7 Sheets-Sheet 1
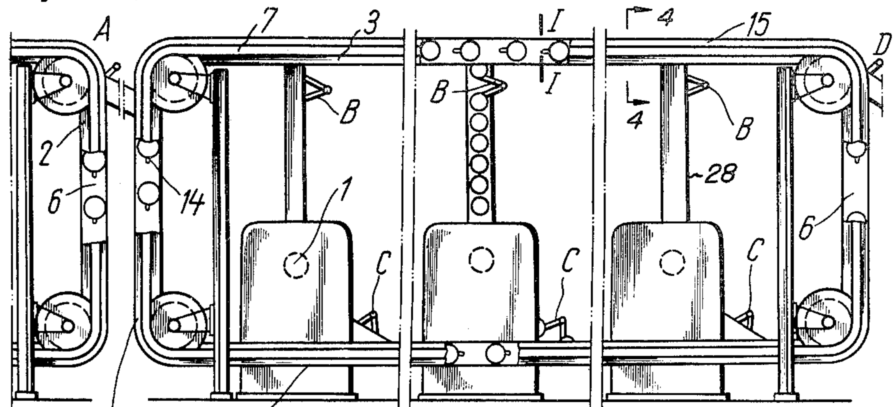
FIG. 1
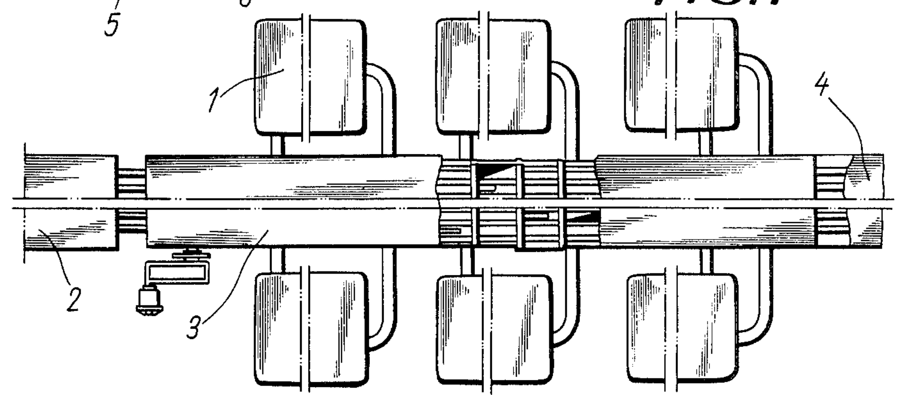
FIG. 3
FIG. 2
FIG. 2a
FIG. 4

21
26
25'
15
21
20
25
24
14
27
23
22
34
38
39'
39
37
36
3

34
21
38

14
39
39'
35
21
37
36
3
14
15

21
14
32

15
21
21
3
21
21
14
30
31
3
28
29
28
30
29
28

47
14
15
15
48
48

14
6
45
46
47
48
49

7;8
47
14
48

United States Patent Office 3,247,030 Patented Apr. 19, 1966

3,247,030

AUTOMATED PRODUCTION LINE FOR MULTIPLE-OPERATION PROCESSING OF WORK, FOR EXAMPLE, BEARING RACES ON MACHINE TOOLS

Vasily Alexeievich Morozov, Leningradskoye Chausse, 102B, Apt. 66; Alexsey Vasilievich Morozov, 2 Tverskaya-Yamskaya Str. 10, Apt. 3; and Alexander Vasilievich Morozov, Khimky, Mayakovsky Str. 36, Apt. 29, all of Moscow, U.S.S.R.

Filed Apr. 18, 1962, Ser. No. 188,467
5 Claims. (Cl. 198—19)

This invention relates to an automated production line for multiple-operation processing of work, for example, bearing races on machine tools.

The present invention concerns the field of mass production of various articles, made of various types of materials, by processing them on automatic machine tools or, more precisely, it concerns automated production lines for multiple-operation machining of various types of work, for example, bearing races, on the automatic machine tools comprising a part of the line.

It is well known, that single-flow automated production lines, comprised of component machine tools which perform consecutively all the operations required to machine articles of a single size, have found applications in plants manufacturing articles by mass production methods, for example, inner and outer races of ball and roller bearings.

It is impossible to manufacture parts of several different sizes simultaneously on these production lines in which the component machine tools have fixed setups and, consequently, it is necessary to provide as many separate automated production lines, each with its own banks or storage units and automatic handling devices, as there are different sized parts that must be processed simultaneously.

A system of alternating workpiece flow is utilized in another known type of single-flow automated production lines for part machining, i.e., lines with provision for periodically resetting and retooling the component machine tools, handling equipment, and all other mechanisms, to machine the same type of parts but of other sizes.

These known types of automated production lines also possess essential disadvantages consisting principally of the necessity for resetting and retooling all of the equipment in the line, for having available duplicate sets of fixtures and tools, for changing or adjusting the handling equipment and distributing mechanisms for each size, and also in requiring increased storage facilities for blanks, work in process, and finished articles; most of these factors leading to a higher initial cost of the line and associated facilities.

A disadvantage of the above-mentioned automated production lines is that they are served by mechanisms of various types and designs, such as: banks or storage units, elevators for these units, distributing conveyers, elevators for these conveyers, output conveyers, and elevators for the machine tools; each mechanism performing only a single operation.

The large number of these different mechanisms leads to over-expenditure of metal for their manufacture, to increased capital outlay and operating costs, and to increased floor space required for their installation.

Though attempts have repeatedly been made to overcome the aforesaid and other difficulties, these attempts, to our knowledge, have not as yet achieved complete success when applied in industry. We, however, have solved this problem and have invented an automated production line for multiple-operation machining that can be successfully employed in industry.

In its wider aspect, the invention is intended for industries manufacturing articles or parts on a mass production basis and refers to an automated production line for multiple-operation machining of work, for example, bearing races on machine tools; the aforesaid line consisting of a series of processing machine tools arranged in groups, each machine of one group performing the same machining operation; endless multiple-operating conveyers arranged in a vertical plane and of a number coinciding with the number of machine tool groups and performing all handling operations required in transferring the work to and from the machine tools; mechanisms for transferring the work from one conveyer to the next and mounted on the vertical branches of the conveyers, mechanisms for distributing the work among the various machine tools of a group and mounted on the upper horizontal branches of the conveyers; and mechanisms for removing the work from the machine tools and mounted on the lower horizontal branches of the conveyers.

An aim of the present invention is the origination of an automated production line for multiple-operation machining of work on machine tools, in which all required handling and banking or storage operations are performed by conveyers only.

The second aim of the present invention is the origination of an automated production line capable of machining work of different sizes simultaneously.

The third aim of the present invention is to simplify the design of the aforesaid line.

Another aim of the present invention is to reduce the floor space occupied by the line.

Still another aim of the present invention is to reduce the costs of manufacture and operation of the line.

In accordance with the foregoing and other aims, the invention consists of a new arrangement and combination of components and parts of the design, which are described below and presented in the patent claims, and it is understood that alterations may be made in the finalized realization of the invention, here revealed, without deviation from the idea involved in the invention.

FIG. 1 is a side elevational view showing automated production line for multiple-operation processing of work on machine tools constructed in accordance with this invention.

FIG. 2 is a fragmentary side elevational view of one end of the automated production line.

FIG. 2*a* is an end elevational view of the production line.

FIG. 3 is a plan view of the automated production line.

FIG. 4 is a cross section of the conveyer taken on the line 4—4 of FIG. 1.

Figures 5, 9, 10:
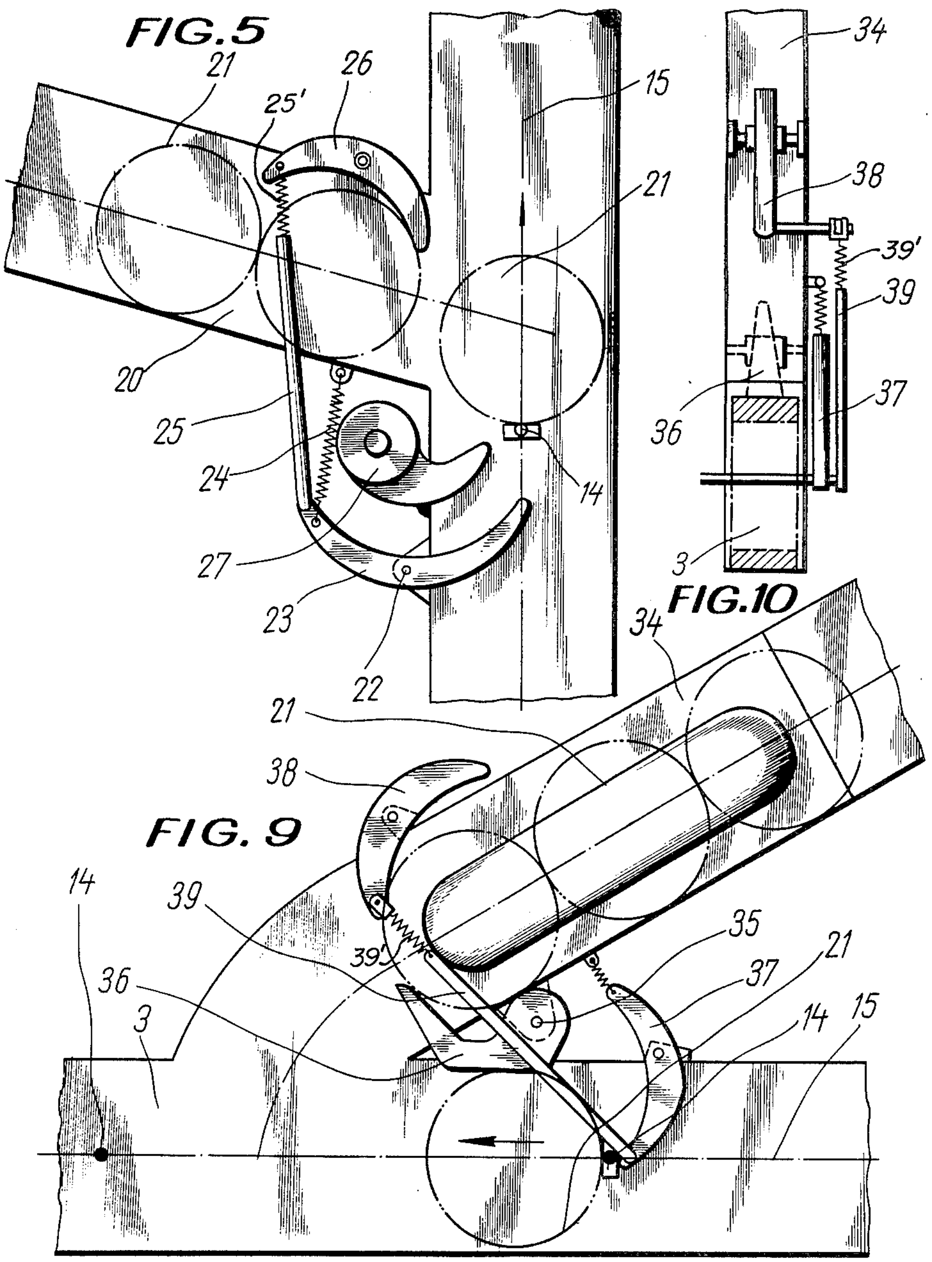

FIG. 5 is a longitudinal sectional view showing the receiver unit of the mechanism for transferring workpieces from one conveyer to the next.

Figure 6:
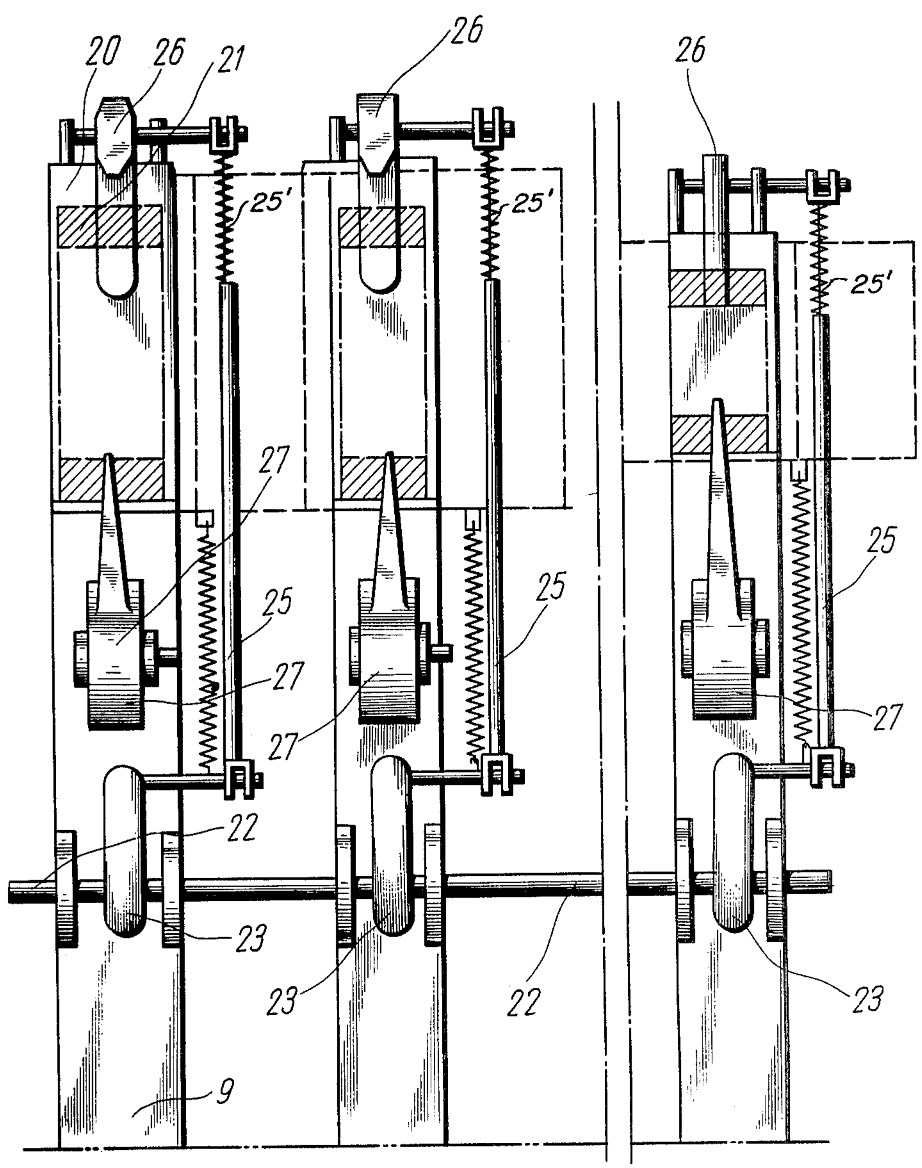

FIG. 6 is a front view of the mechanism shown in FIG. 5 and with parts in section.

Figures 7, 8:
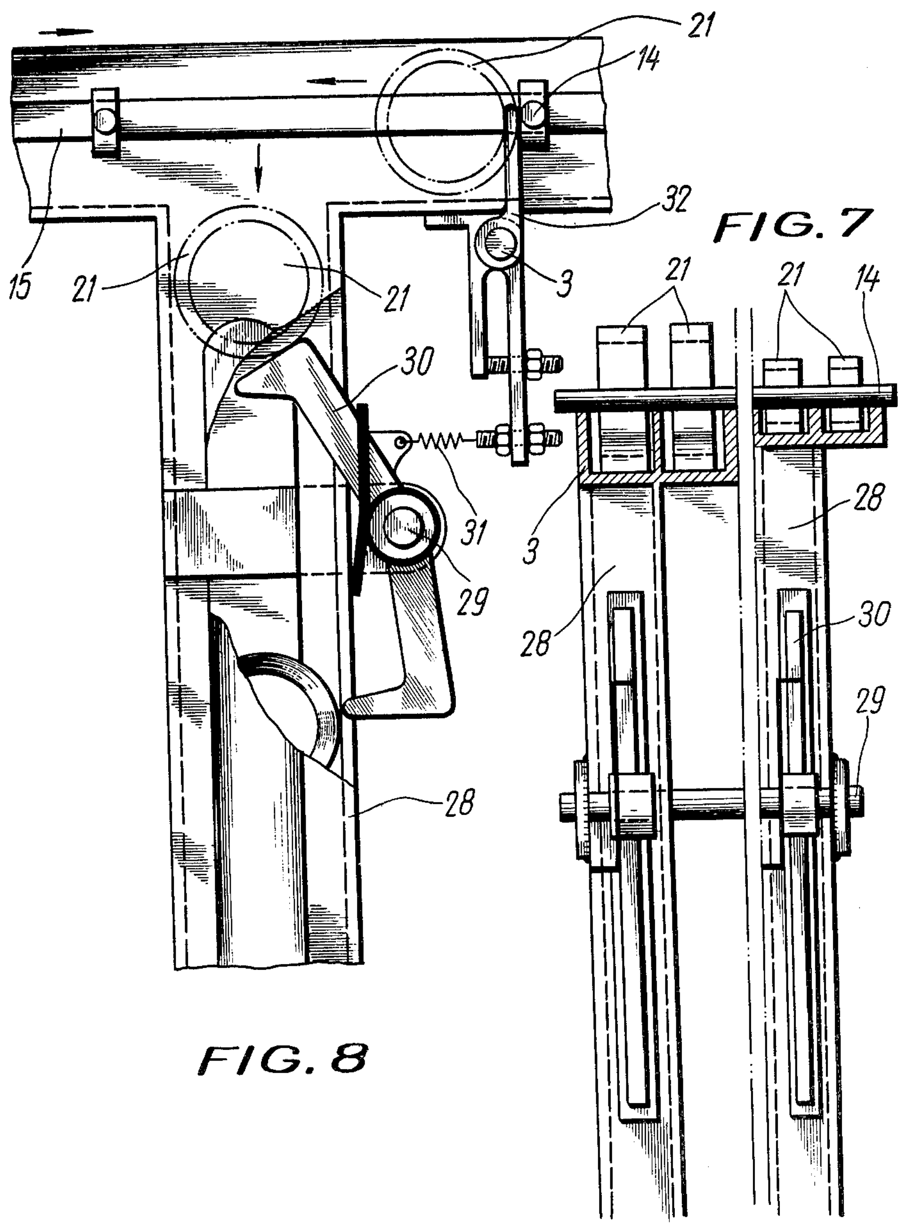

FIG. 7 is a front view with parts in section of the mechanism for distributing blanks or workpieces between the machine tools.

FIG. 8 is a side elevational view with parts broken away of the mechanism shown in FIG. 7.

FIG. 9 is a longitudinal sectional view showing mechanism with parts broken away for removing workpieces from a machine tool.

FIG. 10 is a side elevational view with parts in section of the mechanism shown in FIG. 9.

Figures 11, 11A:
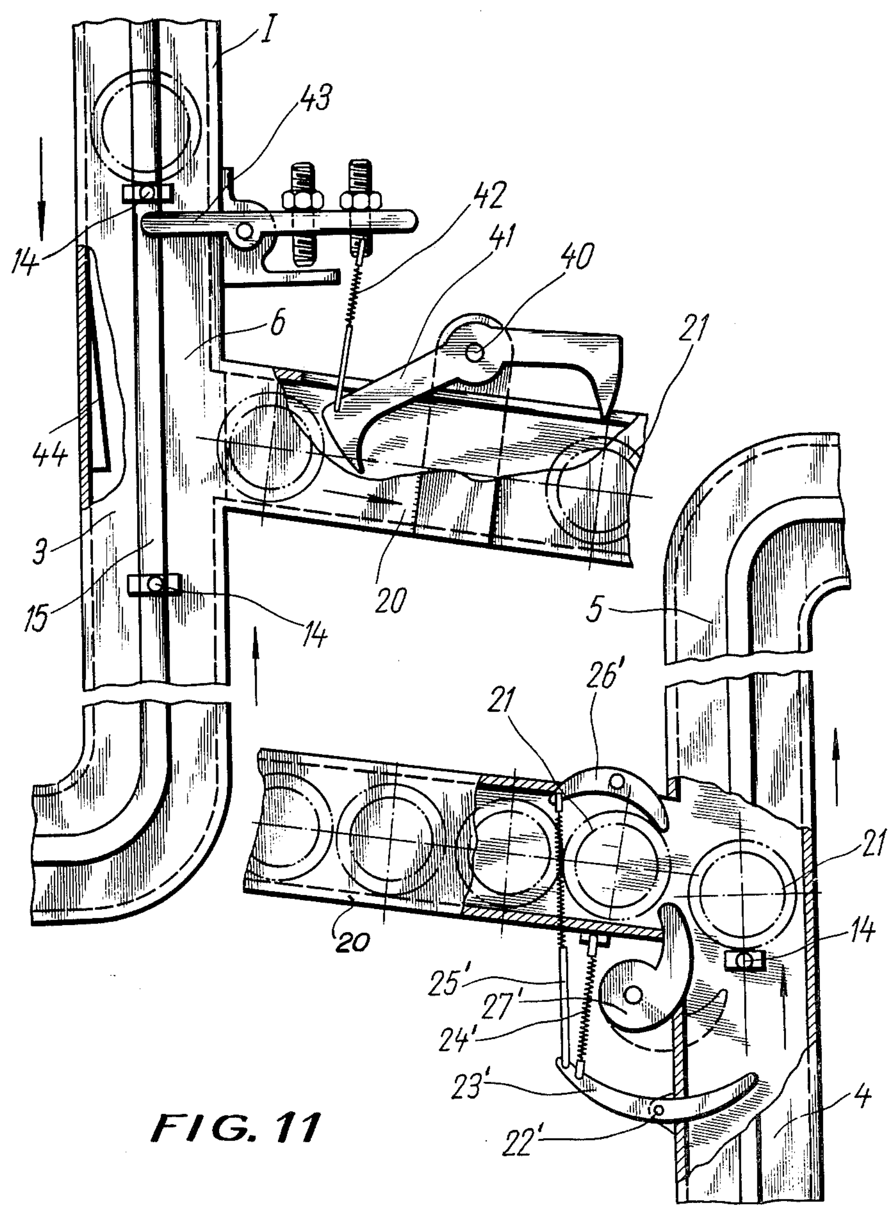

FIGS. 11 and 11*a* are side elevational views with parts broken away and in section and showing mechanisms for receiving workpieces and transferring them from one conveyer to the next.

Figure 12:
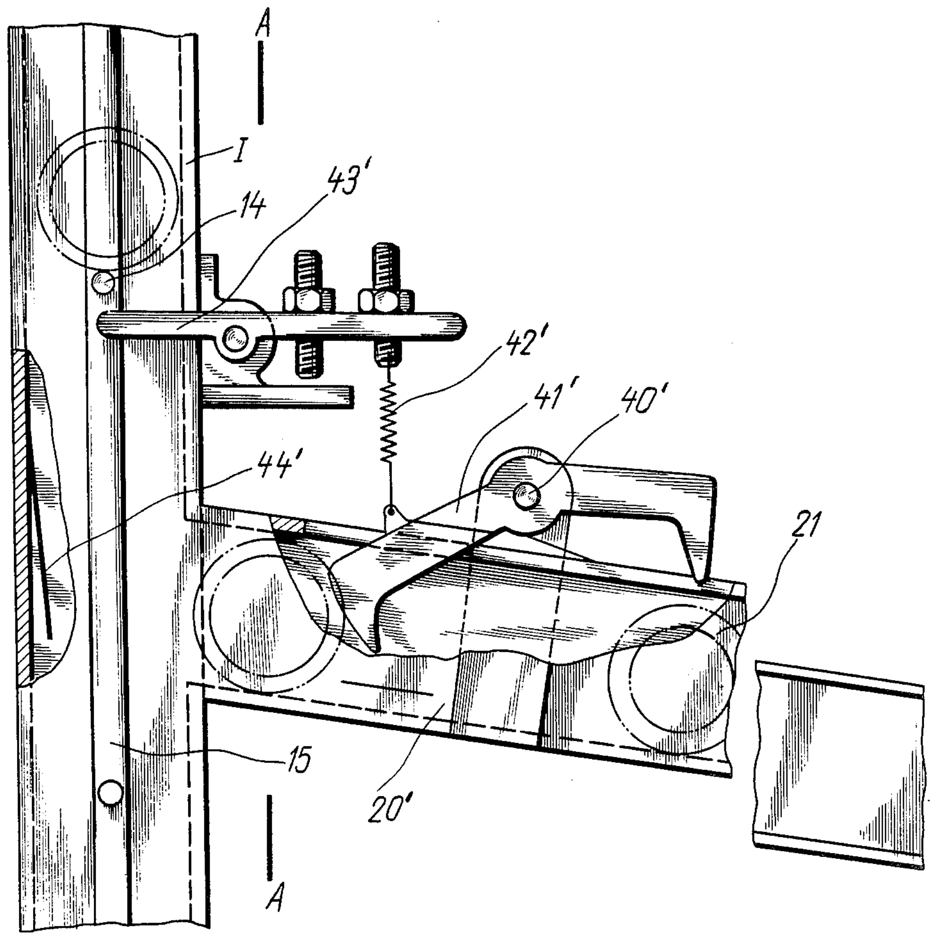

FIG. 12 is a side elevational view with parts broken away and in section and showing mechanism for transferring finished parts from the line to a hopper or to an inspection table.

Figure 13:
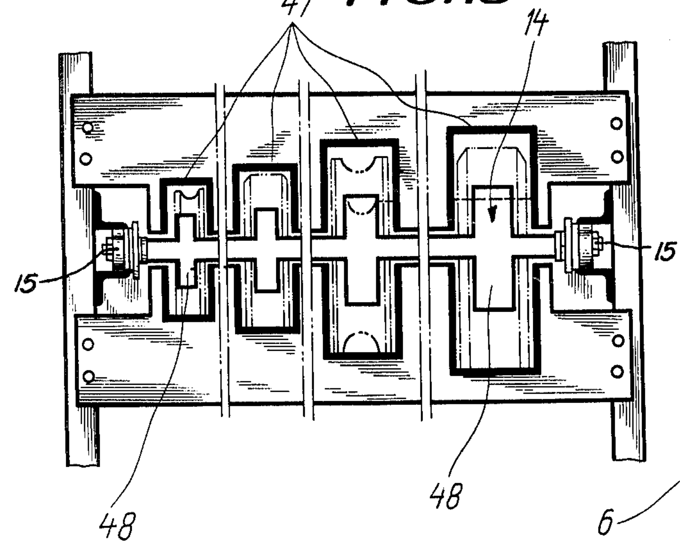
Figure 14:
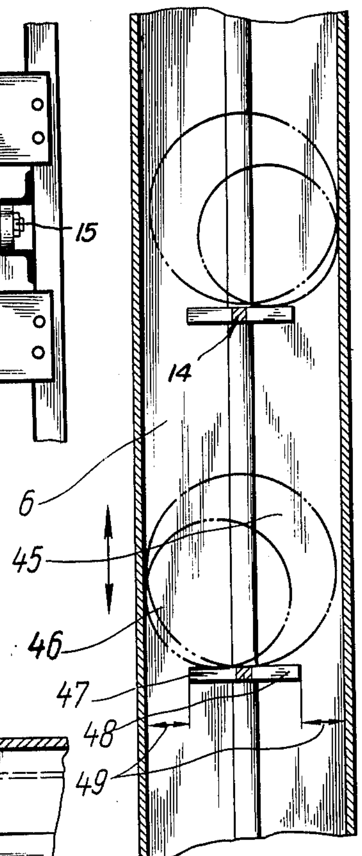
Figure 15:
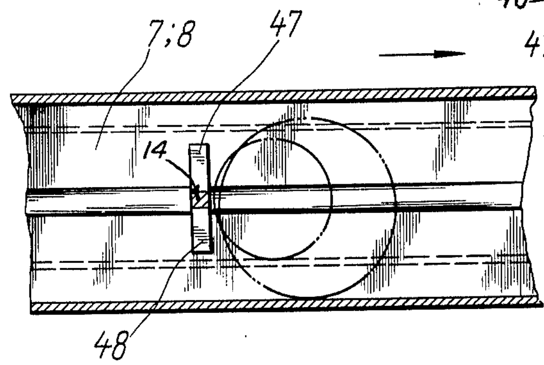

FIGS. 13–15 are elevational and sectional views showing mechanism for conveying workpieces in the conveyer channels.

FIGS. 1 to 3, inclusive, are the three main views of an automated production line including, for example, three groups of machine tools 1, and equipped with several, for instance, three conveyers 2, 3 and 4.

Each conveyer, for example 3, is installed in a vertical plane and has a rectangular form with two vertical branches 5 and 6 and two horizontal branches 7 and 8; these branches including multiple-channel ducts 9 which have two adjacent channels 10 and 11, of the same type, for each size of workpiece to be machined.

Each channel consists of two halves separated longitudinally by a slot and mounted by angles 12 on the uprights 13.

Conveyer elements 14 with double-end flat blades are designed for conveying the workpieces, for example, bearing races, along the duct channels; these elements 14 being linked at their ends to two endless chains 15 which comprise the conveyer together with elements 14. Chains 15 run over sprockets 16, one of which is driven by electric motor 17 through reducing gear 18 and chain 19. Each of the ducts 9 is located between the two rows of machine tools in group 1, designed to perform a given machining operation.

Group-type receiver mechanisms, for receiving the workpieces, such as races from the vertical branch of conveyor 2 or blanks from the loading hopper, if the conveyer concerned is the first in the line, are adjoined to the vertical branch 5 of conveyer 3. These mechanisms, denoted as A in FIG. 1, are shown in more detail in FIGS. 5 and 6.

As shown in FIGS. 5 and 6, each mechanism has an inclined duct 20 for gravity feed of the races 21. Shaft 22, common to all the feed components of ducts 9, freely mounts rocker arms 23, one end of which enter the ducts and are held in this position by springs 24.

Each rocker arm 23 is linked through a tie-rod 25 with a second spring-loaded rocker arm 26. Tripping cams 27 are pivoted under each inclined duct 20 and are actuated by the workpiece circulating in the duct. The cams enter ducts 20 through slots on the under side of the ducts and release each successive race 21 from duct 20 to conveyer 3 only when there is no circulating race in the conveyer on element 14 of chains 15.

In this case, cam 27 lowers by action of gravity to the position shown in FIG. 5 by full lines and the race 21 rolls unimpeded along duct 20 onto element 14.

The conveyer elements 14 engage rocker arms 23 to move the same against the action of spring 24 and this movement through rods 25 and springs 25' causes movement of rocker arms 26 to release a race 21 for movement in the ducts 20. The cams 27 are moved to and maintained in race stopping position by engagement with races carried by the conveyor elements 14 and only permit movement of a race from the duct 20 to the duct 9 when an empty element 14 is disposed to receive a race from the duct 20.

It is impossible for two races to be deposited on element 14 at the same time and, therefore, stoppage or breakdown; due to over-filling the conveyer, are excluded.

Mechanism for distributing the workpieces to be machined between the machine tools of a given flow are adjoined to the horizontal branch 7 of conveyer 3; they are denoted as B in FIG. 1 and are shown in more detail in FIGS. 7 and 8.

As shown here, each aforesaid mechanism has a vertical duct 28 running down from the corresponding channel of conveyer 3. On shaft 29, common to all the ducts and arranged across the vertical ducts 28, rocker arms 30 are pivoted and are linked through springs 31 with rocker arms 32, which are pivoted on pins 33. The rocker arms 32 are perpendicular to the channels of conveyer 3 and are mounted on the lower side thereof.

Rocker arms 32 are actuated by elements 14 on chains 15 and pull back rocker arms 30, through springs 31, opening a passage for race 21 from the duct of conveyer 3 to channel 28 provided channel 28 is not completely filled with races. If, on the other hand, a stack of races already fills channel 8, the lower end of rocker arm 30 will engage the top race of the stack and prevent the upper end of rocker arm 30 from opening the passage to channel 28. In this case, element 14 on chains 15 only stretches spring 31 without swivelling rocker arm 30. The mechanism, illustrated in FIGS. 7 and 8, serves to prevent failure of the line due to overfilling of the ducts 28 which feed blanks to the machine tools.

Mechanisms, denoted as C in FIG. 1 and shown in more detail in FIGS. 9 and 10, are employed to remove machined workpiece from the machine tools to the lower branch 8 of conveyer 3.

As shown here, these mechanisms include ducts 34 into which tripping cams 36 enter. These cams are pivoted on pins 35 and retain the races in the ducts 34 to prevent two races from dropping into a single space between two elements 14 on chains 15. This retaining action occurs when cam 36 is held in its upper position as shown in FIG. 9 by a race 21 rolling along the bottom of the duct of conveyer 3. The mechanism also includes two spring-loaded rocker arms 37 and 38, linked together by tie-rod 39 and spring 39'. The rocker arm 37 is actuated by elements 14 and through tie-rod 39 and spring 39' actuates the second rocker arm 38, permitting retraction of the latter from the lowest race in the inclined duct 34.

A group-type transfer mechanism with two-directional interlocking facilities is adjoined to the vertical branch 6 of conveyor 3 and is designed for transferring workpieces from the conveyer of a given flow to the next conveyer 4. This mechanism is denoted as D in FIG. 1 and is shown in more detail in FIGS. 11 and 11*a*.

The left-hand part of this mechanism includes the multiple-channel gravity-feed duct 20 running from conveyer 3. Above this duct are mounted levers 41 pivoted on pin 40 and linked by springs 42 with rocker arms 43. The latter are actuated by elements 14 on chains 15.

If duct 20 is completely filled with workpieces 21, retaining levers 41 are actuated since the last workpiece 21 in duct 20 to the right of levers 41 holds up the right end of levers 41, while the left end of levers 41 prevents the next workpiece from entering further into duct 20. In this case, spring 42 is stretched but rocker arm 43 does not swivel lever 41 about pin 40.

The flat spring 44 on the inside wall of the channel in the vertical branch of conveyer 3 pushes the conveyed workpiece into duct 20.

The right-hand part of the group-type transfer mechanisms shown in FIG. 11*a* is adjoined to the vertical branch 5 of conveyer 4, for the next group of machine tools, and is equipped with a mechanism which prevents this conveyer from being overfilled by workpieces. This mechanism consists of the cams 27' which are acted on by workpieces in conveyer 4 and prevent the next workpiece 21 from rolling further from duct 20 if element 14 already carries a workpiece 21, circulating in conveyer 4.

If element 14 is empty, then cam 27' will drop to the position shown in dashed lines and, due to the action of element 14 on the rocker arms 23' and 26', the next workpiece 21 will drop into the channel on cam 27'. The next element 14, which when empty does not actuate the cam 27' will remove the workpiece from the cam 27' and convey it upward in the conveyer channel.

Thus, the group-type transfer mechanism, with two-direction interlocking facilities and located between adjacent multiple-channel conveyers of the line, prevents overfilling of the mechanism by workpieces from the preceding conveyers, as well as the overfilling of subsequent conveyers with workpieces from the transfer mechanism.

A group-type mechanism is adjoined to the vertical branch 6 of the last conveyer, for example, 4. This mechanism is shown in detail in FIG. 12 and serves to transfer finished workpieces to a hopper or to an inspection table.

As shown in FIG. 12, the mechanism has a multiple-channel duct 20' on which levers 41', pivoted on pin 40', are mounted. These levers are linked by springs 42' to rocker arms 43' which are actuated by elements 14.

In case duct 20' is completely filled with workpieces 21, lever 41' cannot be actuated since the last workpiece 21, that has entered the duct and is held up for some reason, in a position to the right of the lever 41', lifts the right end of the lever 41' so that the left end prevents the next workpiece from entering further into duct 20 before the preceding workpiece rolls further away to the right of lever 41'.

The element with double-end flat blades, denoted as 14 in FIG. 14 and shown in more detail in FIGS. 13, 14 and and 15, is designed for conveying workpieces of varied size in each of the channels of the vertical sections 5 and 6 and horizontal sections 7 and 8 of the conveyer ducts. The element 14 can convey workpieces of varied overall size from the designed maximum overall size 45, in diameter and thickness, for a given channel, to smaller sizes 46, in a range from 75% to the maximum rated size of conveyed workpieces.

This is accomplished by the use of the elements 14, with double-ended flat blades 47 and 48 and the blades 47 and 48, enter the upper and lower halves of the channels in the horizontal sections of the multiple-channel and in the vertical sections, the lugs enter the right and left halves of the channels.

In this design of double-ended element 14, jamming of smaller sizes of workpieces is prevented because the workpiece is conveyed by the blades of the element 14 in horizontal travel or sets on the blades when moving vertically. Thus, due to the protruding blades, jamming of workpieces is prevented in the upper, lower, and side walls of the channels since the distance 49 between the edge of the blades and the walls of the channel is always less than one-half of the diameter and thickness of workpieces being conveyed.

The present invention may, in particular, be utilized for group-type production lines, comprising automatic lathes, grinding machines, etc., or machine tools that have been automatized, as well as mechanized production lines comprising machine tools that are hand loaded and hand controlled, but which employ multiple-operation conveyers.

In either case, these group-type integrated production lines may be applied in mass or large-lot production or for producing work in comparatively small lots.

It must be noted that, in comparison with known individual single-flow production lines, the present invention provides for reducing the length of automatic motorized handling mechanisms, reducing the amount of metal required for and the cost of the complete production line as a whole, both when calculated on the basis of unit output or per installed machine tool.

The invention also reduces the number of handling mechanisms required because several individual parallel production lines are united into a single integrated group-type production line. At the same time, banks or storage units between the various operations are eliminated since adequate storage is by the conveyors, i.e., a continually travelling store of workpieces is provided. This feature materially reduces the floor space occupied by the production line.

Although the present invention has been described in accordance with the preferred method for its realization, it is understood that alterations and variations are possible without deviating from the idea and scope of the invention.

Such alterations and variations are to be considered as not overstepping the limits of the scope of the invention and the accompanying patent claims.

What we claim is:

1. An automated production line including a conveyor system for simultaneously storing and conveying a reserve of workpieces of several external sizes, for delivering certain of said workpieces to a group of machine tools, for receiving machined workpieces from the machine tools, for storing and conveying a reserve of machined workpieces and for delivering said machined workpieces to a subsequent conveyor system, said first mentioned conveyor system comprising upper and lower horizontal sections and vertical sections connecting the ends of said horizontal sections, a workpiece supporting element common to all sections and in the form of a multiple-channel duct having two identical paired channels for storing reserves of workpieces of each size, the first of each pair of channels serving both for storing a reserve and for delivering workpieces to the machine tools and the second of each pair of channels serving for receiving machined workpieces from the machine tools, storing a reserve of said machined workpieces and feeding the same to a subsequent conveyor system, said channels being disposed in side-by-side relationship, spaced endless chains disposed adjacent the outermost channels of said duct, conveyor elements fixed to said chains and disposed in said channels to convey workpieces along said channels, a common device for receiving and feeding all sizes of workpieces to the corresponding first channels of said duct, vertical ducts connected to the upper horizontal section of the first channels for delivering workpieces to the machine tools, devices for controlling the flow of workpieces from said first channels to said vertical ducts, inclined ducts for delivering machined workpieces from the machine tools to the corresponding second channels, and a common device for transferring all sizes of machined workpieces from said second channels to a subsequent conveyor system.

2. An automated production line as defined in claim 1, in which each of said multiple-channel ducts comprises two spaced opposed half sections containing as many sizes of paired identical channels as there are different external sizes of workpieces to be conveyed, each conveyor element comprising a square bar fixed to said two endless chains and extending between said half sections and oppositely projecting blades on said square bar projecting into the half sections of each channel to convey workpieces along the channels.

3. An automated production line as defined in claim 1, in which the said common device for feeding workpieces of all sizes to said first channels comprises an inclined multiple-channel chute communicating with the first channels of a vertical section of the conveyor, pivotally mounted upper rocker arms projecting into the channels of said inclined chute to engage and prevent movement of workpieces therein, other pivotally mounted lower rocker arms projecting into the channels of said vertical section of the conveyor duct in the path of movement of said conveyor elements, means connecting said upper and lower rocker arms, whereby upon movement of said lower rocker arms by a conveyor element, said upper rocker arms will be retracted to permit movement of workpieces along the channels of said inclined chute into the corresponding first channels of said conveyor, stop cams pivotally mounted and serving to prevent discharge of a workpiece from any channel of said chute if a workpiece is already being carried along the corresponding conveyor first channel by the conveyor element approaching the channels of said inclined chute and in the absence of workpieces on the conveyor elements said cams will permit discharge of workpieces into said first channels of the conveyor duct.

4. An automated production line as defined in claim 1, in which the device for controlling the flow of workpieces from each of the said first channels to the vertical duct comprises a rocker arm pivotally mounted adjacent the mid-point thereof with the opposite ends of said rocker arm being selectively movable into said first channel in the path of movement of workpieces therein, a second pivotally mounted rocker arm having one end disposed in the path of movement of the conveyor elements and a spring connecting the opposite end of the second rocker arm and one end of said first rocker arm, whereby in the event said vertical duct is filled with workpieces said first rocker arm will prevent the delivery of further workpieces from said first channel to said vertical duct, but in the event said vertical duct is partially filled with workpieces, engagement of a conveyor element with said second rocker arm will actuate the same to move said first rocker arm to a position permitting delivery of workpieces from said first channel to said vertical duct.

5. An automated production line as defined in claim 1, in which the common transfer device for transferring workpieces of all sizes to a subsequent conveyor system comprises a multiple-channel inclined chute connected to the channels of a vertical section at the point of discharge of workpieces from the conveyor, several spring-loaded pivotally mounted rocker arms with one end engaging the conveyor elements of the conveyor, a plurality of pivotally mounted double-arm levers, the other end of said rocker arms actuating said double-arm levers through a spring, the ends of said levers entering the channels of the chute in the path of movement of the workpieces and thereby preventing the entrance of new workpieces to the channels of said chute when the same are filled but in the event said channels are partially filled said levers will permit workpieces to enter said channels of the chute, several spring-loaded rocker arms preventing movement of workpieces in the channels of said chute and several other spring-loaded rocker arms partially projecting into channels of the subsequent conveyor duct in the path of movement of conveyor elements, pivotally mounted stop cams engaging workpieces carried by said last mentioned conveyor elements whereby upon said engagement of said rocker arms and stop cams with workpieces and/or conveyor elements, workpieces are either discharged from the multiple-channel inclined chute to the channels of the subsequent conveyor or are retained in the channels of the inclined chute in event workpieces are carried by conveyor elements as the same approach said stop cams of said inclined chute.

References Cited by the Examiner

UNITED STATES PATENTS

| | | | |
|---|---|---|---|
| 2,969,883 | 1/1961 | Cargill | 198—45 |
| 2,987,199 | 6/1961 | Zawaski | 214—16 |
| 3,005,536 | 10/1961 | Dobich | 198—45 |

SAMUEL F. COLEMAN, *Primary Examiner.*

WILLIAM B. LABORDE, *Examiner.*